US008641861B2

(12) United States Patent
Grip et al.

(10) Patent No.: US 8,641,861 B2

(45) Date of Patent: Feb. 4, 2014

(54) SOLAR COLLECTOR DEVICES AND METHODS OF ASSEMBLY

(75) Inventors: Robert E Grip, Rancho Palos Verdes, CA (US); Russell K Jones, Manhattan Beach, CA (US)

(73) Assignee: The Boeing Company, Chicago, IL (US)

( * ) Notice: Subject to any disclaimer, the term of this patent is extended or adjusted under 35 U.S.C. 154(b) by 1273 days.

(21) Appl. No.: 11/763,611

(22) Filed: Jun. 15, 2007

(65) Prior Publication Data

US 2008/0308142 A1 Dec. 18, 2008

(51) Int. Cl.
*B32B 37/00* (2006.01)
*B29C 65/00* (2006.01)

(52) U.S. Cl.
USPC ............................ 156/297; 156/293; 126/569

(58) Field of Classification Search
USPC .......... 156/297, 299, 242, 245, 293; 126/569, 126/696, 700; 136/246; 359/855
See application file for complete search history.

(56) References Cited

U.S. PATENT DOCUMENTS 1,946,184 A * 2/1934 Abbot ........................... 126/603
2,801,128 A * 7/1957 Washabaugh ................ 294/67.2
3,298,886 A * 1/1967 Vevoda ......................... 156/285
4,038,971 A * 8/1977 Bezborodko ................. 126/606
4,115,177 A * 9/1978 Nelson .......................... 156/245
4,202,322 A * 5/1980 Delgado et al. ............... 126/574
4,268,332 A 5/1981 Winders
4,736,976 A * 4/1988 Berzenye ...................... 294/82.1
4,820,033 A * 4/1989 Sick .............................. 359/852
5,731,834 A 3/1998 Huot et al.
6,089,382 A 7/2000 Eros et al.
2005/0034751 A1 2/2005 Gross et al.
2005/0161074 A1 7/2005 Garvison et al.
2007/0070531 A1 3/2007 Lu

FOREIGN PATENT DOCUMENTS

WO 2006/138619 A2 12/2006
WO 2007/022756 A2 3/2007

OTHER PUBLICATIONS

European Patent Office: International Search Report and Written Opinion for PCT/US2008/064549 filed May 22, 2008; (Search Report issued Sep. 14, 2011).

* cited by examiner

*Primary Examiner* — John Goff
(74) *Attorney, Agent, or Firm* — Klintworth & Rozenblat IP LLC

(57) ABSTRACT

In one embodiment, a method of assembling optical elements is provided. At least a portion of each optical element is disposed against at least a portion of a high precision surface. A structural frame is disposed adjacent the optical elements. At least two portions of the structural frame are aligned relative to each other and to the high precision surface with high precision. Adhesive is applied to adhere the structural frame to the optical elements. The adhesive is cured. In other embodiments, optical element assemblies are provided.

19 Claims, 5 Drawing Sheets

10 52 48 47 18 14 50 20 36 30 32 38 16 34 22 26 12 39 28 24 29 13 C D 15

SOLAR COLLECTOR DEVICES AND METHODS OF ASSEMBLY

BACKGROUND

The assembly of an array of optical elements is often time consuming and costly. In one existing assembly, approximately one-hundred solar reflectors of a concentrating photovoltaic solar collector array are attached to a support structure. Each solar reflector is then adjusted individually in order to put each solar collector into the proper alignment in order to properly direct the sun's rays. This may be time intensive, expensive, unreliable, inaccurate, and/or may experience one or more additional types of problems.

A device, method of use, and/or method of manufacture is needed to decrease one or more problems associated with one or more of the existing devices and/or methods for assembling optical elements.

SUMMARY

In one aspect of the disclosure, a method of assembling optical elements is provided. In one step, at least a portion of each optical element is disposed against at least a portion of a high precision surface. In another step, a structural frame is disposed adjacent the optical elements. At least two portions of the structural frame are aligned relative to each other and to the high precision surface with high precision. In yet another step, adhesive is applied to adhere the structural frame to the optical elements. In an additional step, the adhesive is cured.

In another aspect of the disclosure, an optical element assembly comprises a plurality of optical elements, and a structural frame adhered to the plurality of optical elements at adhesive joints. At least two portions of the structural frame are aligned relative to each other and to the plurality of optical elements with high precision.

In a further aspect of the disclosure, an optical element assembly comprises a structural frame adhered to optical elements at adhesive joints. When the optical element assembly was assembled, at least a portion of each optical element was disposed against at least a portion of a high precision surface. The structural frame was disposed adjacent the optical elements with at least two portions of the structural frame being aligned relative to each other and to the high precision surface with high precision. Adhesive was applied at adhesive joints to adhere the structural frame to the optical elements. The adhesive was cured.

These and other features, aspects and advantages of the disclosure will become better understood with reference to the following drawings, description and claims.

DETAILED DESCRIPTION

The following detailed description is of the best currently contemplated modes of carrying out the disclosure. The description is not to be taken in a limiting sense, but is made merely for the purpose of illustrating the general principles of the disclosure, since the scope of the disclosure is best defined by the appended claims.

Figure 1:
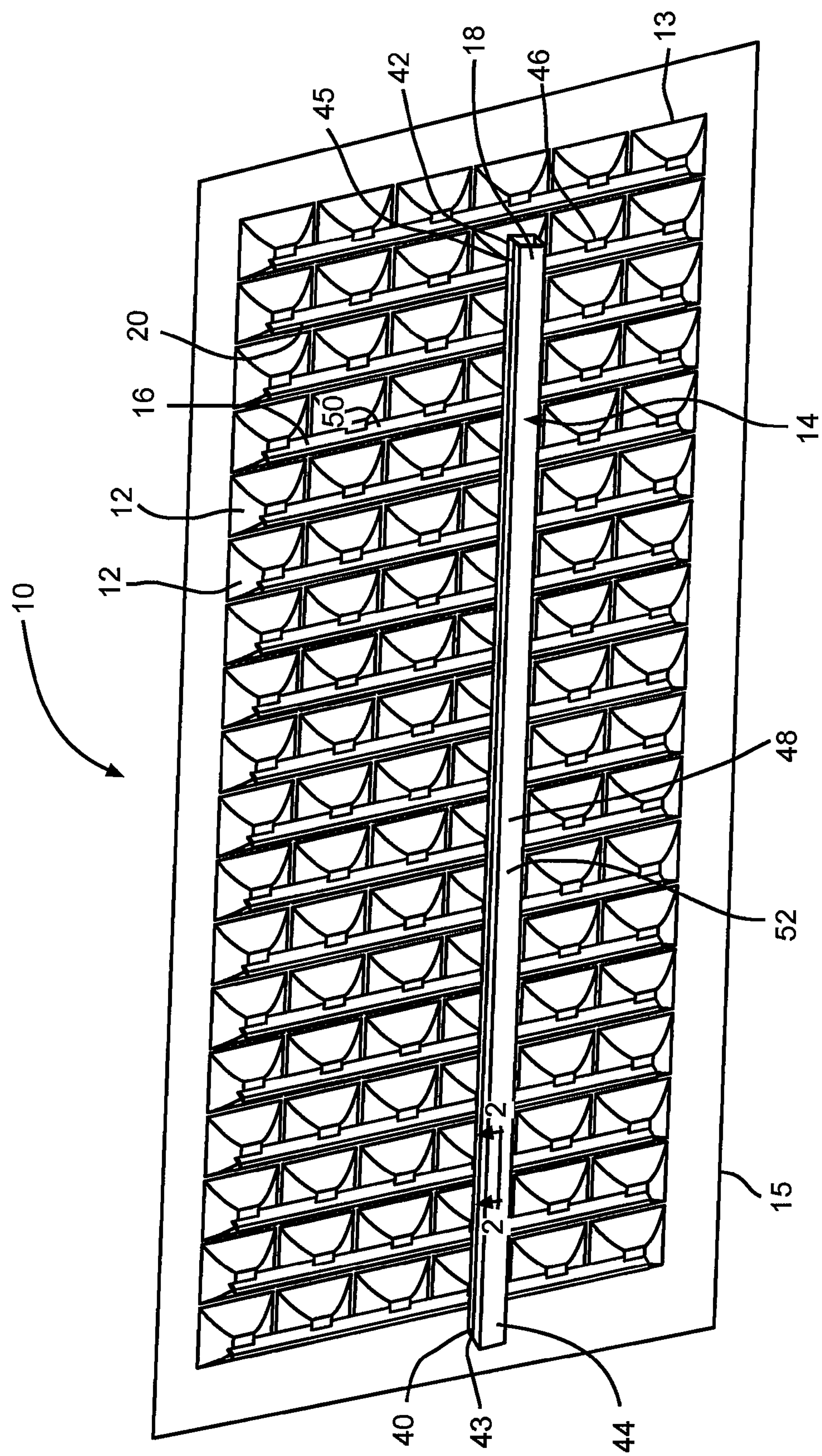
FIG. 1 shows a top perspective view of one embodiment of an optical element assembly.
Figure 2:
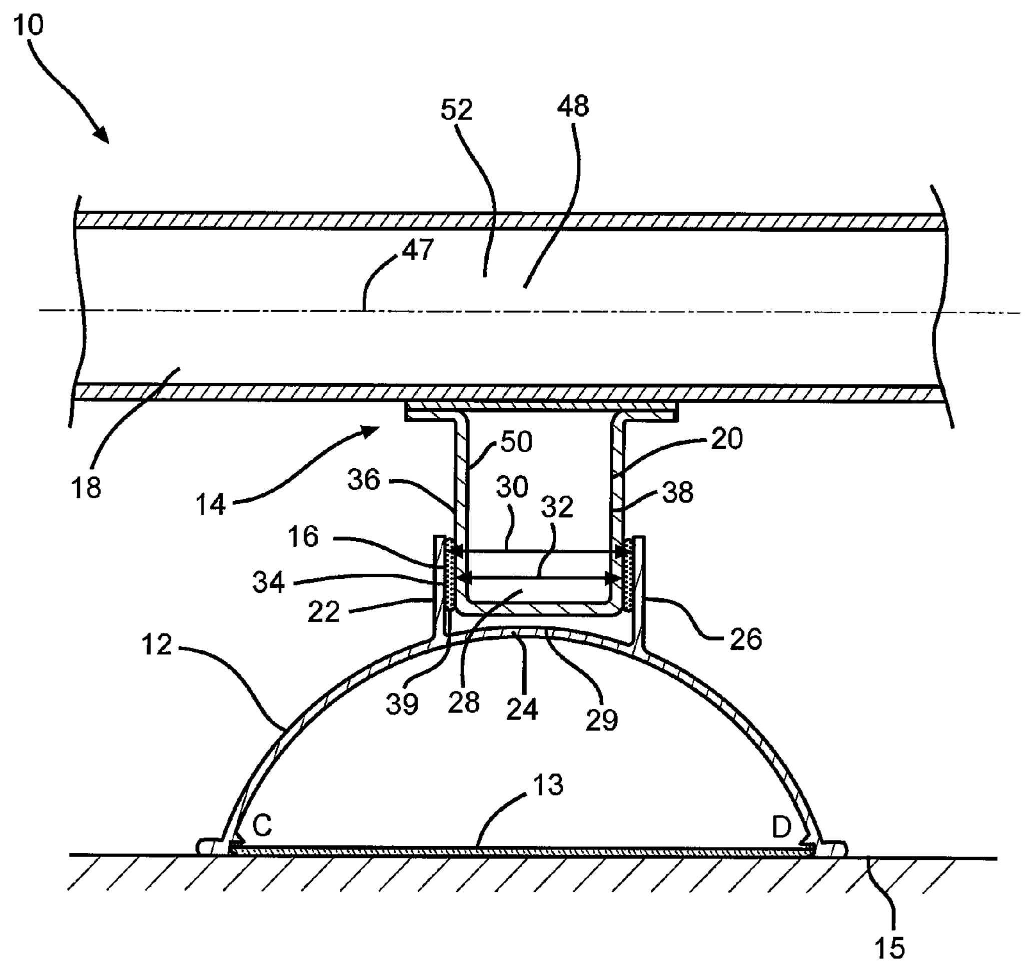
FIG. 2 shows a partial cross-section view through line 2-2 of the embodiment of FIG. 1.

FIG. 1 shows a top perspective view of one embodiment of an optical element assembly 10. FIG. 2 shows a partial cross-section view through line 2-2 of the embodiment of FIG. 1. As shown in FIGS. 1-2, the optical element assembly 10 may include a plurality of optical elements 12, and a structural frame 14 adhered to the optical elements 12 at adhesive joints 16. The optical elements 12 may comprise high-precision solar collectors for collecting sun rays from the sun to be used for electricity. At least a portion of the bottom surfaces 13 of each optical element 12 may be disposed against at least a portion of a surface 15 which is substantially high precision, which may comprise a high precision table, a high precision flat surface, or other type of high precision tool or fixture. The high precision surface 15 may be substantially flat, or in other embodiments, in any high precision configuration. In such manner, at least a portion of the bottom surfaces 13 of each optical element 12 may be aligned in a high precision parallel alignment. In other embodiments, the optical elements 12 may be in varying planes, configurations, and orientations. In one embodiment, the high precision interface between the optical elements 12 and the high precision surface 15 may comprise the entire bottom surface 13 of each optical element against the high precision surface 15. In another embodiment, the high precision interface between the optical elements 12 and the high precision surface 15 may not be continuous, but rather may comprise discrete points on the bottom surfaces 13 of each optical element 12. In still another embodiment, the high precision surface 15 may not be a continuous surface, but rather may be an array of small surfaces or other high precision interfaces that are aligned precisely. In one embodiment, only certain portions of the high precision flat surface 15 which interface with certain portions of the bottom surfaces 13 of each optical element 12 may be high precision, and other portions of the surface 15 and/or the bottom surfaces 13 of each optical element 12 may be low precision.

The structural frame 14 may comprise a torque tube 18 and a plurality of beam members 20 which are perpendicularly attached to the torque tube 18 through welding, bolting, or other type of fastening means. The torque tube 18 may be approximately eighteen feet long and rectangular. In other embodiments, the torque tube 18 may be of varying shapes or sizes. In one embodiment, eighteen square beam members 20, which may each be approximately six feet long and approximately five inches high by approximately five inches wide, may be perpendicularly attached to the torque tube 18 in a spaced-apart configuration. In other embodiments, any type, number, size, configuration, and/or orientation of beam members 20 may be attached to any type, number, size, configuration, and/or orientation of torque tube 18, or other type of member. In still other embodiments, the structural frame 14 may have varying types and numbers of members in varying arrangements. In additional embodiments, the structural frame 14 may comprise any type of supporting structure which may be attached to a sun tracker.

Each optical element 12 may have surfaces 22, 24, and 26 which collectively form a generally U-shape 28 extending from a top portion 29 of the optical element 12. The width 30 of the U-shape 28 of each optical element 12 may be slightly larger than a width 32 of each beam member 20, thereby allowing the beam members 20 to be inserted into and partially disposed, in a variety of orientations and configurations, within the U-shape 28 of each optical element 12. When the beam members 20 are disposed in the ideal locations within the U-shapes 28 of each optical element 12, the beam members 20 may be adhered to the optical elements 12 at the adhesive joints 16. The adhesive joints 16 may comprise the area 34 within the U-shape 28 of each optical element 12 where surfaces 36 and 38 of the beam members 20 may be adhered to surfaces 22 and 26 of each optical element 12 using any type of adhesive 39 such as a glue, paste, epoxy, or other type of adhesive 39. The adhesive 39 may be located in any portion of the joint 16. In one embodiment, seven optical elements 12 may be adhered to each beam member 20 in a spaced-apart configuration. In other embodiments, any number of optical elements 12 may be adhered to each beam member 20. In additional embodiments, the beam members 20 may be adhered to varying shaped, sized, types, and numbers of surfaces located in varying portions of each beam member 20. In other embodiments, the optical elements 12 may be adhered to any configuration of frame supporting structure using adhesive joints. In still other embodiments, the adhesive 39 may be located in varying locations and/or configurations with respect to the optical element 12 and the frame supporting structure utilized.

At least two portions 40 and 42 of the structural frame 14 may be formed, aligned, and/or attached relative to each other, to the plurality of optical elements 20, and to the high precision surface 15 with high precision. In one embodiment, only two portions 40 and 42 at each end 44 and 46 of the torque tube 18 may be formed, aligned, and/or attached relative to each other, to the plurality of optical elements 20, and to the high precision surface 15 with high precision. The only two portions 40 and 42 may comprise two high precision holes 43 and 45 in the torque tube 18, which may be used by at least one of a tool and a jig to move the torque tube 18 into a precise position. An axis 47 which extends through the only two portions 40 and 42 may be parallel to a surface 13 of each optical element 20. In other embodiments, varying numbers, sizes, types, locations, and configurations of portions of the structural frame 14 may be formed, aligned, and/or attached relative to each other and to the plurality of optical elements 20 with high precision.

Other portions 48 and 50 of the structural frame 14 may be formed, aligned, and/or attached relative to each other and to the adhesive joints 16 with low precision. In one embodiment, portion 48 of the structural frame 14 may comprise the entire torque tube 18 with the exception of high precision portions 40 and 42 at each end 44 and 46 of the torque tube 18. For instance, the entire middle section 52 of the torque tube 18 may be formed, aligned, and/or attached with low precision. Portion 50 of the structural frame 14 may comprise each beam member 20. For instance, each entire beam member 20 in its entirety may be formed, aligned, and/or attached to the torque tube 18 with low precision. In other embodiments, portions 48 and 50 of the structural frame 14, which are formed, aligned, and/or attached with each torque tube 18 with low precision, may comprise varying areas of the structural frame 14.

By using a high precision tool and/or jig inserted within or against the high precision portions 40 and 42 of the torque tube 18, the smaller widths 32 of each beam member 20 may be disposed within the larger widths 30 of the U-shapes 28 of each optical element 12. The axis 47 running through the high precision portions 40 and 42 may then be adjusted so that it is in a parallel alignment with respect to the bottom surfaces 13 of each optical element 12 against the high precision surface 15. The larger widths 30 of the U-shapes 28 of each optical element 12 may allow for the adjusting of the positions of the beam members 20, having smaller widths 32, with respect to the positions of the optical elements 12.

When the adjusting is finished and an ideal alignment has been reached, adhesive 39 may be used to adhere the beam members 20 to the optical elements 12 so that the bottom surfaces 13 of each optical element 12 are fixedly disposed in a parallel alignment with respect to the axis 47 running through the high precision portions 40 and 42 of the torque tube 18. In such manner, the optical elements 12 may be positioned in high precision orientations with respect to the high precision portions 40 and 42 of the torque tube 18, despite the other portions 48 and 50 of the structural frame 14 being low precision, and the adhesive joints 16 being low precision. This may provide savings in labor time, may lower costs, may lower machine and tool requirements, may improve accuracy and reliability, and/or may reduce one or more other problems of one or more prior art devices, systems, and/or methods.

Figure 3:
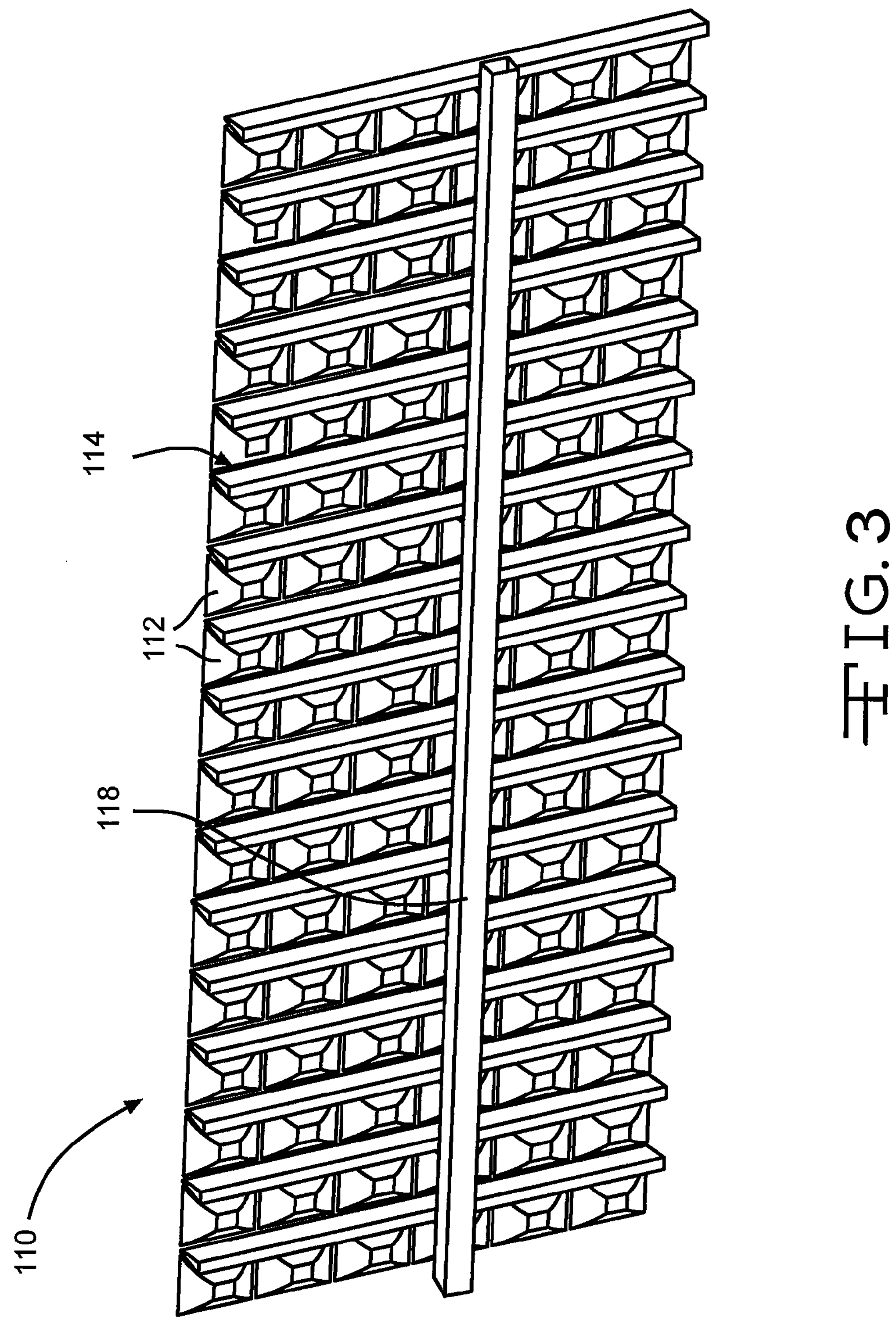
FIG. 3 shows a perspective view of another embodiment of an optical element assembly.
Figure 4:
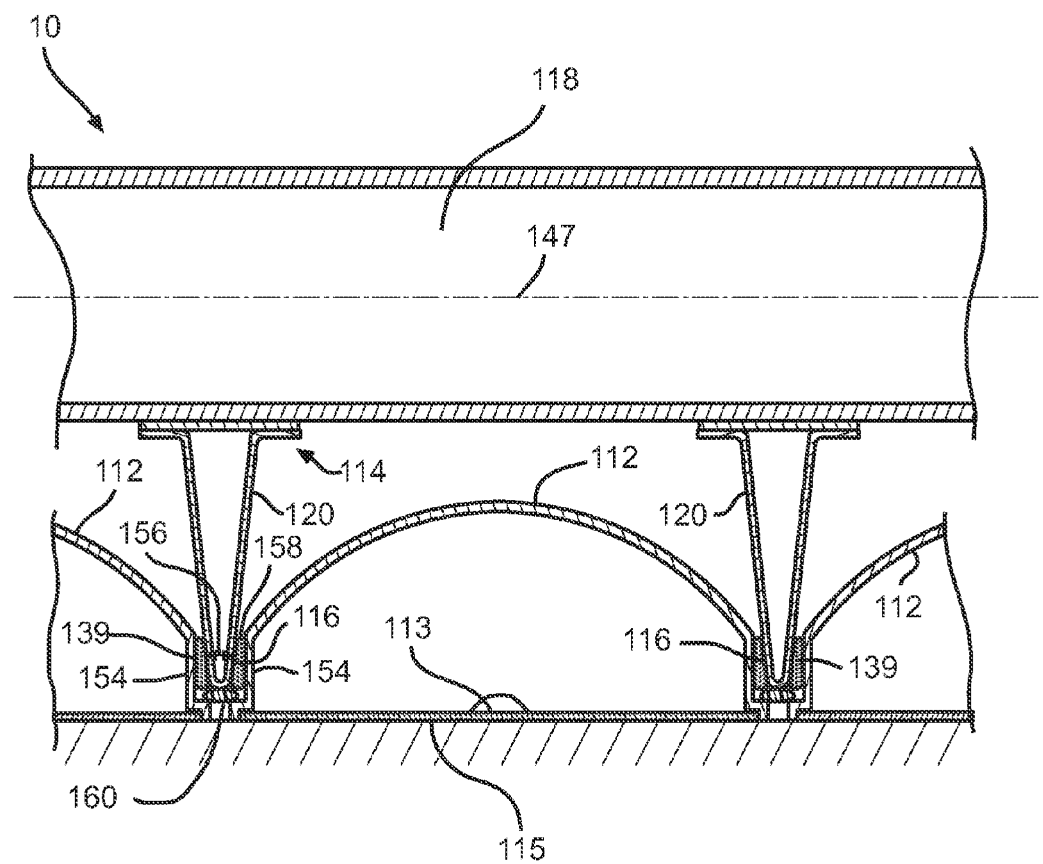
FIG. 4 shows a partial cross-section view through line 4-4 of the embodiment of FIG. 3.

FIG. 3 shows a perspective view of another embodiment of an optical element assembly 110 comprising a plurality of optical elements 112, and a structural frame 114 adhered to the optical elements 112 at adhesive joints 116. FIG. 4 shows a partial cross-section view through line 4-4 of the embodiment of FIG. 3. At least a portion of the bottom surfaces 113 of each optical element 112 may be disposed against at least a portion of a surface 115 which is high precision so that the bottom surfaces 113 of each optical element 112 are aligned in a high precision parallel alignment. The high precision surface 115 may be flat or in other high precision configurations. The structural frame 114 may comprise a torque tube 118 and a plurality of beam members 120 which are attached to the torque tube 118 through welding, bolting, or other type of fastening means. The beam members 120 may be substantially V-shaped and may be adhered, using any type of adhesive 139 such as a glue, paste, epoxy, or other type of adhesive, at the adhesive joints 116 to side surfaces 154 of the optical elements 112.

The width 156 of a bottom portion 158 of each V-shaped beam member 120 may be smaller than a distance 160 between adjacent side surfaces 154 of adjacent optical elements 112. The bottom portion 158 of each V-shaped beam member 120 may be adjusted between the adjacent side surfaces 154 of the optical elements 112 so that the axis 147 running through the high precision portions of the torque tube 118 is disposed in a parallel alignment with respect to the bottom surfaces 113 of the optical elements 112. The bottom portion 158 of each V-shaped beam member 120 may then be adhered to the adjacent side surfaces 154 using adhesive 139 to fixedly dispose the assembly 10 in this orientation. In other embodiments, the beam members 120 may be of varying shapes, sizes, and/or configurations, and may be adhered to varying surfaces of the optical elements 112.

Figure 5:
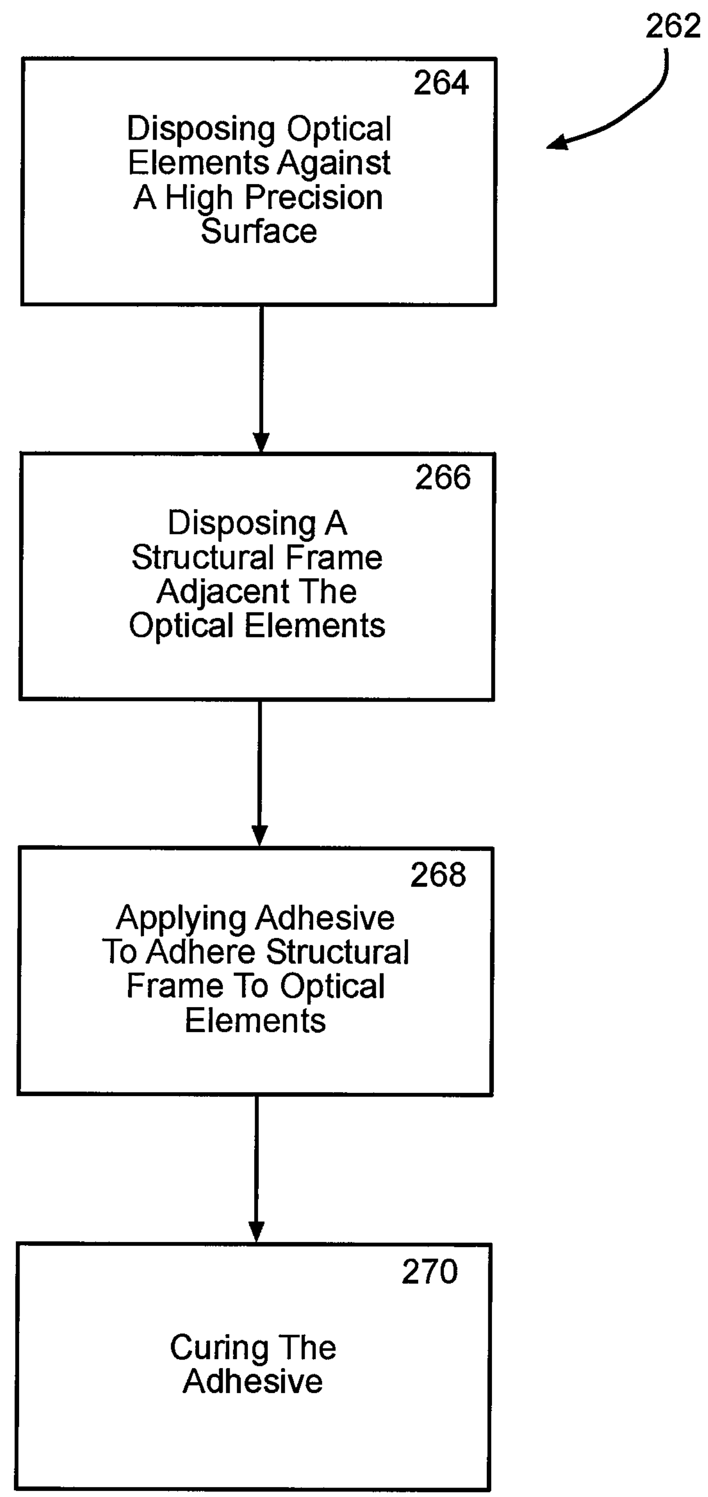
FIG. 5 is a flowchart showing one embodiment of a method for of assembling high precision optical elements.

FIG. 5 shows a flowchart of one embodiment 262 of a method of assembling high precision optical elements 12. In one step 264, at least a portion of each optical element 12 may be disposed against at least a portion of a surface 15 which is substantially high precision, which may comprise a high precision table, a high precision flat surface, or other type of high precision tool or fixture. The surface 15 may be substantially flat or in other high precision configurations. The optical elements 12 may comprise a plurality of solar collectors, or other type of optical elements. In another step 266, a structural frame 14 may be disposed adjacent the optical elements 12, which have at least portions disposed against at least portions of the high precision surface 15. Two high precision portions 40 and 42 of the structural frame 14 may be disposed so that an axis 47 extending through the portions 40 and 42 is parallel to the high precision surface 15. This may be accomplished using at least one of a tool and a jig attached to the two high precision portions 40 and 42 of the structural frame 14.

The structural frame 14 may comprise a torque tube 18 and a plurality of beam members 20 which may be attached perpendicularly to the torque tube 18. The beam members 20 may be rectangular, square, v-shaped, or other shape, and may be formed, aligned, or attached with low precision. At least two portions 40 and 42 of the structural frame 14 may be formed, aligned, or attached relative to each other and to the high precision surface 15 with high precision. In one embodiment, only two portions 40 and 42 of the structural frame 14 may be formed, aligned, or attached relative to each other at to the high precision surface 15 with high precision. The portions 40 and 42 may comprise two high precision holes 43 and 45 defined in the structural frame 14. In another embodiment, the at least two portions 40 and 42 may comprise portions of the torque tube 18.

Other portions 48 and 50 of the structural frame 14, including one or more portions of the torque tube 18 and the beams 20, may be formed, aligned, or attached with low precision. In step 268, adhesive 39 may be applied to adhere the structural frame 14 to the optical elements 12. This may be done by forming low precision adhesive joints 16. In one embodiment, step 268 may occur after step 266, while in another embodiment, step 268 may occur before step 266. In yet another step 270, the adhesive 39 may be cured to fixedly dispose the assembly 10 into this configuration.

In another embodiment, an optical assembly 10 may be provided comprising a structural frame 14 adhered to optical elements 12 at adhesive joints 16. When the optical element assembly 10 was assembled, at least a portion of each optical element 12 may have been disposed against at least a portion of a high precision surface 15. The surface 15 may be substantially flat or in other high precision configurations. The structural frame 14 may have been disposed adjacent the optical elements 12 with at least two portions 40 and 42 of the structural frame 14 being aligned relative to each other and to the high precision surface 15 with high precision. Adhesive 39 may have been applied at the adhesive joints 16 to adhere the structural frame 14 to the optical elements 12. The adhesive 39 may have been cured to fix the structural frame 14 in position with respect to the optical elements 12.

One or more embodiments of the disclosure may provide one or more of the following advantages over one or more of the existing devices, systems, and/or methods: savings in labor time, lower costs, lower machine and/or tool requirements and/or necessities, improved accuracy and/or reliability, improved use and/or function, and/or may reduce one or more other problems of one or more prior art devices, systems, and/or methods.

It should be understood, of course, that the foregoing relates to exemplary embodiments of the disclosure and that modifications may be made without departing from the spirit and scope of the disclosure as set forth in the following claims.

The invention claimed is:

1. A method of assembling optical elements comprising:

disposing a plurality of optical elements against a precision surface so that parallel surfaces of the optical elements are disposed perpendicularly to the precision surface;

aligning a frame member, having additional frame members attached to and extending from the frame member, into a pre-determined position relative to the precision surface to dispose the optical elements, disposed against the precision surface, between the frame member and the precision surface, and to dispose the additional frame members against and between the parallel surfaces of the optical elements; and adhering the additional frame members, attached to and extending from the frame member, against and between the parallel surfaces of the optical elements disposed against the precision surface while the frame member is aligned in the pre-determined position relative to the precision surface.

2. The method of claim 1 wherein the optical elements comprise solar collectors.

3. The method of claim 1 wherein the precision surface comprises a table, a tool, or a fixture.

4. The method of claim 1 wherein the frame member comprises a torque tube and the additional frame members comprise beam members.

5. The method of claim 1 wherein the additional frame members are welded or bolted to the frame member.

6. The method of claim 1 wherein the aligning comprises aligning two portions of the frame member to align the frame member into the pre-determined position.

7. The method of claim 6 wherein the two portions of the frame member comprise two holes disposed in the frame member.

8. The method of claim 1 wherein the additional frame members are rectangular, square, or v-shaped.

9. The method of claim 7 wherein the aligning comprises inserting a tool or a jig into said two holes of said frame member in order to align said frame member into the pre-determined position.

10. The method of claim 1 wherein the optical elements comprise a flat surface and a curved surface.

11. The method of claim 10 wherein the disposing comprises disposing the flat surfaces of the optical elements against the precision surface, which is also flat.

12. The method of claim 1 wherein the optical elements comprise U-shaped surfaces, the aligning comprises disposing the additional frame members against and within the U-shaped surfaces of the optical elements, and the adhering comprises adhering the additional frame members within and to the U-shaped surfaces of the optical elements.

13. The method of claim 1 wherein the aligning comprises disposing the additional frame members against and in-between the parallel surfaces of the optical elements, which are separate and adjacent to one another, and the adhering comprises adhering the additional frame members to and in-between the parallel surfaces of the separate and adjacent optical elements.

14. The method of claim 1 wherein the precision surface is flat.

15. A method of assembling optical elements comprising:

disposing a plurality of optical elements against a precision surface so that a surface of each optical element is disposed perpendicularly to the precision surface;

aligning a frame member, having additional frame members attached to and extending from the frame member, into a pre-determined position relative to the precision surface to dispose the optical elements, disposed against the precision surface, between the frame member and the precision surface, and to dispose each of the additional frame members against a corresponding perpendicular surface of a corresponding optical element; and adhering the additional frame members, attached to and extending from the frame member, against and to the corresponding perpendicular surface of the corresponding optical element disposed against the precision surface while the frame member is aligned in the pre-determined position relative to the precision surface.

16. A method of assembling optical elements comprising:

disposing a plurality of optical elements, comprising U-shaped surfaces, against a precision surface;

aligning a frame member, having additional frame members attached to and extending from the frame member, into a pre-determined position relative to the precision surface, by disposing the additional frame members against and within the U-shaped surfaces, to dispose the optical elements, disposed against the precision surface, between the frame member and the precision surface, and to dispose the additional frame members against the optical elements; and adhering the additional frame members, attached to and extending from the frame member, within and to the U-shaped surfaces of the optical elements disposed against the precision surface while the frame member is aligned in the pre-determined position relative to the precision surface.

17. A method of assembling optical elements comprising:

disposing a plurality of optical elements, each comprising a first flat surface and a curved surface, against a precision surface without disposing a second flat surface of each optical element against the precision surface;

aligning a frame member, having additional frame members attached to and extending from the frame member, into a pre-determined position relative to the precision surface, by disposing the additional frame members against and in-between the second flat surfaces of the optical elements which are adjacent to one another, to dispose the optical elements, disposed against the precision surface, between the frame member and the precision surface, and to dispose the additional frame members against the optical elements; and adhering the additional frame members, attached to and extending from the frame member, to and in-between the second flat surfaces of the adjacent optical elements disposed against the precision surface while the frame member is aligned in the pre-determined position relative to the precision surface.

18. A method of assembling optical elements comprising:

disposing a plurality of optical elements against a precision surface, wherein the optical elements comprise U-shaped surfaces comprising parallel surfaces;

aligning a frame member, having additional frame members attached to and extending from the frame member, into a pre-determined position relative to the precision surface to dispose the optical elements, disposed against the precision surface, between the frame member and the precision surface, and to dispose the additional frame members against and between the parallel surfaces of the optical elements within the U-shaped surfaces; and adhering the additional frame members, attached to and extending from the frame member, against and between the parallel surfaces of the optical elements within the U-shaped surfaces while the frame member is aligned in the pre-determined position relative to the precision surface.

19. A method of assembling optical elements comprising:

disposing a plurality of optical elements against a precision surface so that the optical elements are separate and adjacent to one another, wherein the optical elements comprise parallel surfaces;

aligning a frame member, having additional frame members attached to and extending from the frame member, into a pre-determined position relative to the precision surface to dispose the optical elements, disposed against the precision surface, between the frame member and the precision surface, and to dispose the additional frame members against and in-between the parallel surfaces of the optical elements; and adhering the additional frame members, attached to and extending from the frame member, against and in-between the parallel surfaces of the separate and adjacent optical elements disposed against the precision surface while the frame member is aligned in the pre-determined position relative to the precision surface.

* * * * *